US007167484B2

(12) United States Patent
Liang et al.

(10) Patent No.: US 7,167,484 B2
(45) Date of Patent: Jan. 23, 2007

(54) CENTRALIZED COORDINATION POINT FOR WIRELESS COMMUNICATION DEVICES USING MULTIPLE PROTOCOLS

(75) Inventors: Ping Liang, Irvine, CA (US); Menghua Chen, Irvine, CA (US)

(73) Assignee: Oxford Semiconductor, Inc., Milpitas, CA (US)

( * ) Notice: Subject to any disclaimer, the term of this patent is extended or adjusted under 35 U.S.C. 154(b) by 744 days.

(21) Appl. No.: 10/066,284

(22) Filed: Feb. 1, 2002

(65) Prior Publication Data

US 2002/0136184 A1 Sep. 26, 2002

Related U.S. Application Data

(60) Provisional application No. 60/278,458, filed on Mar. 22, 2001, provisional application No. 60/328,882, filed on Oct. 11, 2001, provisional application No. 60/336,339, filed on Oct. 18, 2001.

(51) Int. Cl.
*H04L 12/413* (2006.01)
(52) U.S. Cl. ....................... 370/445; 370/462
(58) Field of Classification Search ............... 370/338, 370/445, 331, 466, 344, 347, 478, 255, 345, 370/465, 328, 329, 313, 395.5, 282, 253, 370/254, 315, 316, 310, 332, 95.1, 95.3, 370/431, 100.1, 105.1, 79, 82, 85.1, 85.2, 370/85.3, 274, 279, 293, 319, 320, 321, 492, 370/310.2, 341, 462; 375/132, 202, 269, 375/347; 379/59, 58, 60, 63; 340/825.02, 340/825.04, 825.03, 825.06, 825.07
See application file for complete search history.

(56) References Cited

U.S. PATENT DOCUMENTS

| 5,042,083 | A | | 8/1991 | Ichikawa |
| 5,682,381 | A | * | 10/1997 | Sekihata et al. ............. 370/332 |
| 5,852,405 | A | * | 12/1998 | Yoneda et al. ......... 340/825.02 |
| 6,278,693 | B1 | | 8/2001 | Aldred et al. |
| 6,405,257 | B1 | | 6/2002 | Gersht et al. |
| 6,600,726 | B1 | | 7/2003 | Nevo et al. |
| 6,690,657 | B1 | * | 2/2004 | Lau et al. .................... 370/315 |
| 6,775,258 | B1 | | 8/2004 | Van Valkenburg et al. |
| 2001/0010689 | A1 | * | 8/2001 | Awater et al. ............... 370/344 |
| 2002/0061031 | A1 | | 5/2002 | Sugar et al. |
| 2002/0136184 | A1 | | 9/2002 | Liang et al. |
| 2002/0136233 | A1 | | 9/2002 | Chen et al. |
| 2002/0173272 | A1 | | 11/2002 | Liang et al. |
| 2002/0191677 | A1 | * | 12/2002 | Chen et al. .................. 375/132 |
| 2003/0054827 | A1 | | 3/2003 | Schmidt et al. |
| 2003/0058830 | A1 | | 3/2003 | Schmidt |
| 2005/0078616 | A1 | | 4/2005 | Nevo et al. |
| 2005/0130687 | A1 | | 6/2005 | Filipovic et al. |

OTHER PUBLICATIONS

U.S. Appl. No. 60/238,761.

* cited by examiner

*Primary Examiner*—Brenda Pham
(74) *Attorney, Agent, or Firm*—Knobbe, Martens, Olson & Bear, LLP

(57) ABSTRACT

Wireless communication networks utilize various communication protocols to exchange data between wireless network devices. Overlapping communication frequencies between data exchange protocols present a collision problem when data transmissions interfere with one another during wireless transit. A device for moderating transmission traffic in a wireless network where overlapping communication frequencies coexist is described to reduce or avoid interference caused by signal collisions.

53 Claims, 6 Drawing Sheets

COORDINATION POINT USED TO REDUCE DATA COLLISIONS

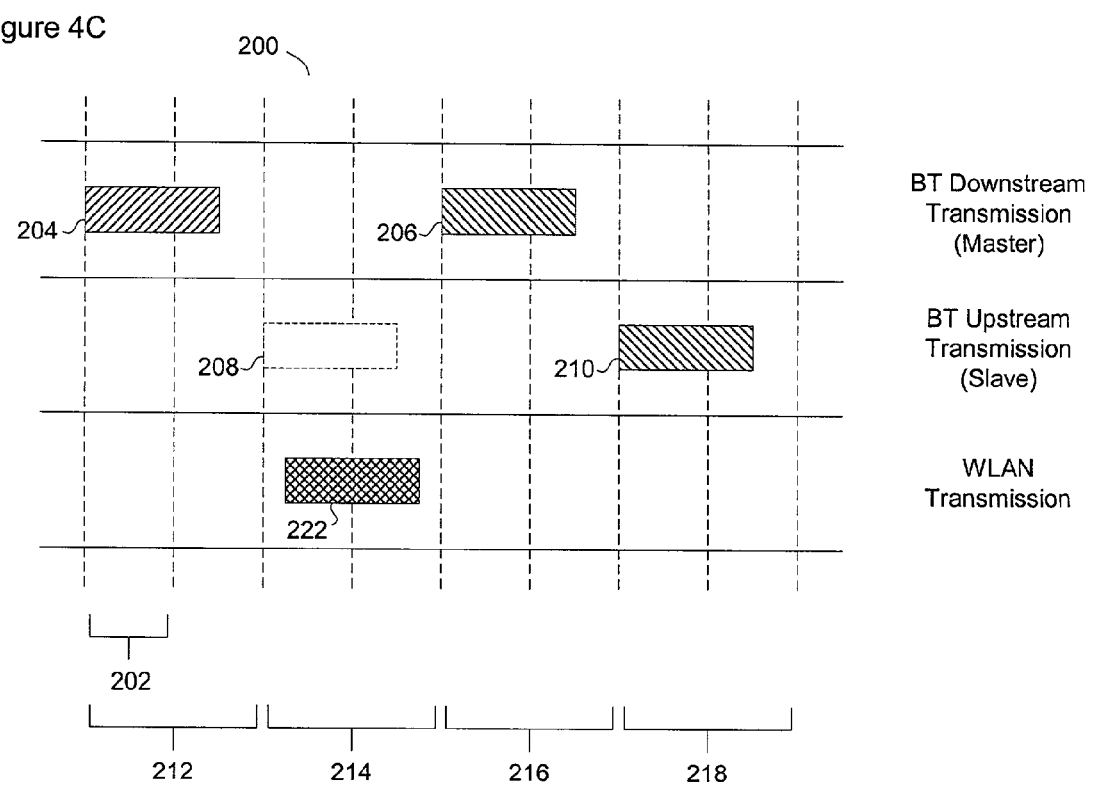

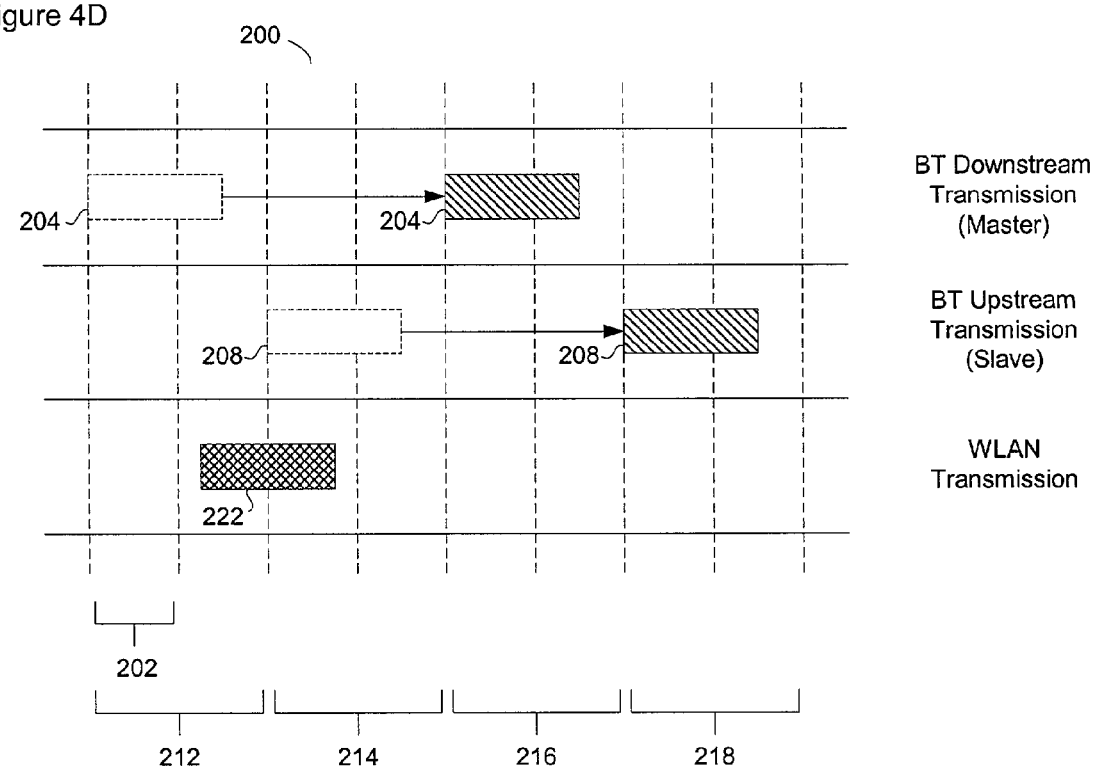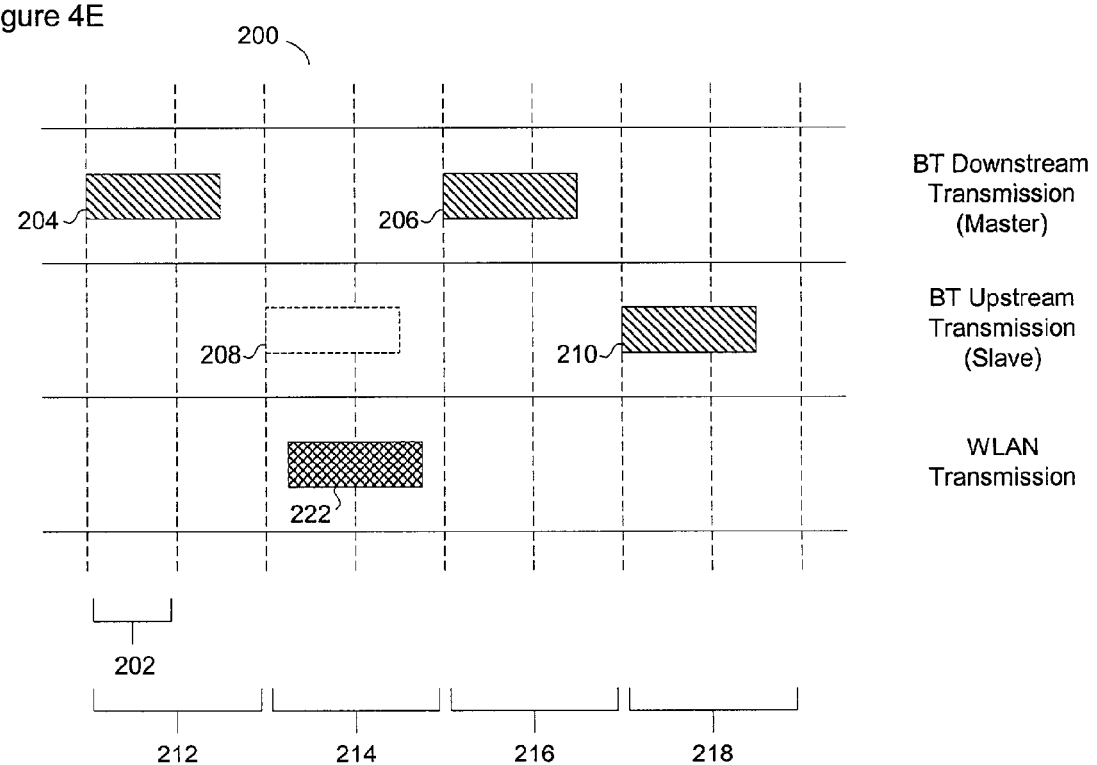

CENTRALIZED COORDINATION POINT FOR WIRELESS COMMUNICATION DEVICES USING MULTIPLE PROTOCOLS

CLAIM OF PRIORITY

This U.S. patent application claims priority to U.S. Provisional Patent Application Nos. 60/278,458, entitled "Collision Avoidance In Wireless Communication Devices" filed Mar. 22, 2001; 60/328,882 entitled "Recognition Scheme for Moderating Wireless Protocols", filed Oct. 11, 2001; and 60/336,339, entitled "Remotely-Cooperative Scheduling Solution for Moderating Wireless Protocols", filed Oct. 18, 2001 which are hereby incorporated by reference. Additionally, this application incorporates by reference the following co-pending applications: attorney docket number TRANDIM.006A, application Ser. No. 10/003,703, filed Oct. 23, 2001, entitled "Coordination Architecture For Wireless Communication Devices Using Multiple Protocols" and attorney docket number TRANDIM.007A entitled "Collision Rectification In Wireless Communication Devices".

BACKGROUND OF THE INVENTION

1. Field of the Invention

The present invention relates to wireless networking systems and, in particular, to a coexistive solution for frequency-overlapping wireless communication protocols.

2. Description of the Related Art

Wireless communication and networking protocols are increasingly used to provide connectivity for diverse classes of electronic devices. These wireless protocols permit electronic devices such as computers, personal digital assistants (PDA), and mobile phones to transmit and receive information without the requirement of physically interconnecting the electronic devices to one another or to communications mediums via wire or cable connections. Wireless connectivity in this manner increases portability and flexibility in electronic devices and has become an important method by which data and information is distributed.

Numerous standards have been proposed for use in transmitting and receiving information in wireless local area networks. Two emerging protocols which have received widespread acceptance include Bluetooth (BT) and IEEE 802.11 (WLAN) wireless protocols. These protocols share a common frequency spectrum in the 2.4-GHz Industrial, Scientific, and Medical (ISM) band and are used to exchange information between electronic devices which support the appropriate protocol. Both protocols offer high speed data exchange rates and may be integrated into devices for connecting to land-based or wired communications networks such as the Internet. In general, wireless protocols, such as BT and WLAN, transmit data by superimposing the desired information on a carrier radio wave. Data is recovered through the use of a receiver which specifically tunes to the transmission frequency of the carrier signal to receive the signal and decode the information contained therein.

The Bluetooth protocol is designed primarily for short-range wireless communication between electronic devices in small localized networks (piconets). The network topology in the Bluetooth piconet comprises up to eight active devices, with a maximum of three synchronous-connection-oriented (SCO) links. These SCO links further support real-time communications such as those required for voice or telephony applications. The Bluetooth protocol additionally supports asynchronous connection links (ACL) which are typically used to exchange data and information in non-time critical applications. Within the piconet topology, only one Bluetooth device may typically transmit at a time, and transmissions are managed using a master/slave relationship. One Bluetooth device is designated as a master device and controls other slave device transmissions within the piconet. The master device coordinates transmissions within the piconet by continually polling the slave devices to determine which slave devices require a clear channel to transmit data. Slave devices receive "permission" from the master device before transmitting information and only transmit information when "asked" to do so by the master device. Controlling slave transmission traffic in this manner permits the master device to schedule and manage information exchange within the piconet and prevents data collisions and corruption due to overlapping data transmissions from multiple devices.

Bluetooth device communication can be further characterized by the use of a frequency-hopping spread spectrum (FHSS) technique. With the FHSS technique, data is transmitted in discrete packets along different frequencies within the 2.4-GHz ISM band. The Bluetooth protocol specifies that frequency hops be made at the rate of approximately 1600 hops/sec such that data exchange takes place with the data spread throughout the ISM band. This type of spread spectrum (SS) technique utilizes a relatively high energy transmission along a narrow band for a limited time.

Alternatively, the WLAN wireless protocols may be used to connect electronic devices in a peer-to-peer network. With the peer-to-peer type of network, there are no strict servers or hierarchy among communicating devices. In this network topology, each electronic device within the wireless network functions as its own server and determines when to send and receive information without a dedicated administrative server or master device. Devices in the WLAN wireless network contend for access to the available radio frequencies and bandwidth using a sensing and collision avoidance protocol to improve the rate of data and information transmission.

WLAN device communication can be further characterized by the use of a direct-sequence spread spectrum (DSSS). In a DSSS communication environment, data is transmitted along a wide bandwidth with relatively low energy. Typically, DSSS divides the available ISM band into eleven sub-channels through which data is transmitted with no frequency hopping characteristics. WLAN protocols occupy these fixed channels of the ISM band, (passbands), to transmit and receive information between compatible devices.

While the aforementioned wireless protocols function well in environments where only one wireless protocol in the ISM band is in operation, a problem arises in local area networks where Bluetooth and WLAN devices coexist. The shared frequency range of the two protocols inevitably results in transmission interference and data corruption as the two protocols operate with transmission frequencies that overlap at various times during routine transmission of information. The resulting frequency overlap degrades the network performance and transmission rates in both families of devices due to a lack of ability of wireless devices which use differing protocols to coordinate their data transmissions. This problem is exacerbated as the number of wireless devices within the network increases and is further affected by the proximity in which the wireless devices are placed with respect to one another. Thus, in order to prevent undue network performance degradation, a compensation scheme must be devised to facilitate the coexistence of shared frequency network topologies such as those used by BT and WLAN protocols.

The widespread acceptance of both the Bluetooth and WLAN wireless protocols has further lead to the manufacture of a large number of electronic devices which typically incorporate only a single wireless technology or protocol for network communication. This creates an additional problem as there are many existing wireless networks which necessarily dictate the type of wireless protocol which can be used within the network or in the vicinity of those devices in the network. Wireless devices which do not comply with the protocol of the existing wireless network may be incompatible with the network and may be precluded from use. Thus, a user may be denied access to wireless devices which cannot be integrated into the existing wireless network infrastructure because of conflicting wireless standards. In the absence of a unifying device which permits the use of more than one wireless standard in the same service area, existing wireless devices in the network may be required to be replaced with updated devices which are capable of communicating using multiple wireless standards to prevent timing and data collisions. Clearly, device replacement in this manner is undesirable as it may be prohibitively expensive and preclude the use of wireless devices which operate with differing frequency-overlapping protocols.

Currently, coexistive methods and mechanisms are difficult to implement due to the requirement of using a wired back haul device or a dual mode radio with a special protocol. Additionally, interference and transmission collision between frequency competing protocols can be significant, and, therefore, coexistive systems are not easily implemented in current wireless local area networks that utilize a plurality of protocols.

Based on the foregoing, a need exists for a system to facilitate the coexistence of wireless devices which operate with different frequency-overlapping protocols such as the Bluetooth and WLAN wireless protocols. A desirable feature of such a system is to permit the use of existing wireless devices without substantial modification. Furthermore, this system should manage cross-protocol trafficking to reduce collisions and interference between the wireless protocols using mixed topologies so as to permit wireless devices with differing protocols to function within the same transmission area.

SUMMARY OF THE INVENTION

The aforementioned needs are satisfied by a centralized control point described herein below. In one embodiment, the centralized coordination point is a transmission coordination device for a wireless communication network, wherein a first plurality of communication devices using a first protocol and a second plurality of communication devices using a second protocol exchange information within the wireless communication network using overlapping communication frequencies. In this embodiment, the transmission coordination device comprises a signal processing component, which is configured to receive information derived from the first and second plurality of network devices, a traffic evaluation component that assesses the information received by the signal processing component to identify impending collisions between the first and the second protocol, and a traffic coordination component that determines a communication link type between a master device and a slave device using the first protocol based on the type of communication link between the master device and the slave device.

In one aspect, the transmission coordination device utilizes the traffic coordination component to reduces collision between information exchanged using the first protocol and the second protocol. In addition, the communication link type may comprise a voice data type having a synchronous-connection-oriented communication link and/or a general application data type, wherein the general application data type is an asynchronous-connection-link communication link.

In another aspect, the traffic coordination component prioritizes the exchange of information in the wireless communication network by delaying information exchange in the first or second protocol. Alternatively, the traffic coordination component prioritizes the exchange of information by dropping at least some of the information exchanged in the first or the second protocol.

Moreover, the transmission coordination device may be interposed between a backbone network and the wireless communications network and acts as an access point to link the wireless communication devices to the backbone network, wherein the backbone network may include various land-based networks including Ethernet, digital subscriber line, dial-up, or plane telephone networks.

Furthermore, the first protocol or the second protocol may comprise a frequency-hopping spread spectrum protocol, wherein the frequency-hopping spread spectrum protocol may include a Bluetooth protocol. Alternatively, the first or the second protocol may comprise a direct-sequence spread spectrum protocol, wherein the direct-sequence spread spectrum protocol includes a wireless local area network (WLAN) protocol.

In another embodiment, the aforementioned needs may be satisfied by a centralized coordination device for a wireless communication network, wherein information exchange devices using a first protocol and a second protocol transmit a plurality of frequency-overlapping communication signals in the wireless communication network. In this embodiment, the centralized coordination device comprises a signal processing component that is configured to receive and analyze timing characteristics from the plurality of frequency-overlapping communication signals, an evaluation component that is configured to communicate with the signal processing component and further configured to determine a type of communication link type established by the information exchange devices using the first protocol, and a coordination component that is used to prioritize the plurality of frequency-overlapping communication signals based on the timing characteristics and the communication link type to reduce collisions in the information exchange of the first and second protocols.

In still another embodiment, the aforementioned needs may be satisfied by a centralized coordination system for a wireless communication network, wherein the wireless transfer of information is exchanged using overlapping communication frequencies. The centralized coordination system may comprise a station access area, wherein a plurality of Bluetooth communication devices using a Bluetooth protocol generate a plurality of Bluetooth communication signals, and a plurality of WLAN communication devices using a WLAN protocol generate a plurality of WLAN communication signals. The centralized coordination system may further comprise a Bluetooth master device configured to receive and analyze the plurality of Bluetooth communication signals derived from the plurality of Bluetooth communication devices and the plurality of WLAN communication signals derived from the plurality of WLAN communication devices.

In one aspect, the centralized coordination system may still further comprise a traffic evaluation component used by the Bluetooth master device to evaluate the timing of the plurality of Bluetooth and the WLAN communication signals and to identify impending collisions between the plurality of Bluetooth and the WLAN communication signals in the wireless communication network. Moreover, the centralized coordination system may still further comprise a traffic coordination component used to determine a type of communication link established between the Bluetooth master device and the plurality of Bluetooth communication devices, wherein the traffic coordination component prioritizes the plurality of wireless network transmissions to reduce collisions between Bluetooth and WLAN communication signals and to improve throughput in the wireless communication network. In addition, the traffic coordination component may be interposed between a backbone network and the station access area to regulate the wireless transfer of information between the plurality of Bluetooth and WLAN communication devices and the backbone network.

Alternatively, the aforementioned needs may be satisfied by a communication system for a wireless network comprising a plurality of wireless communication devices, which communicate using a first and a second frequency-overlapping data exchange protocol, and a centralized coordination access point used to control the exchange of data and information between at least some of the wireless communication devices using at least one of a plurality of frequency-overlapping data exchange protocols. The communication system may further comprise a signal processing component used by the centralized coordination access point to monitor the wireless communication signals of the first and the second protocol, and an evaluation component used by the centralized coordination access point to identify impending collisions between the wireless communication signals of the first and second protocol.

Moreover, the communication system may still further comprise a coordination component used by the centralized coordination access point to determine the transmission relationship between the plurality of wireless network devices using the first protocol, wherein the transmission relationship further identifies a communication link between a master device and a slave device, wherein the master device communicates with the slave device using downstream transmission signals and the slave device communicates with the master device using upstream transmission signals, and a synchronization component used by the centralized coordination access point to implement a collision avoidance procedure based on the type of communication link between the master device and the slave device to reduce collisions and improve throughput in the wireless communication network.

In one aspect, the centralized coordination access point moderates the wireless communication signals by influencing the downstream transmission signals associated with at least some of the wireless communication devices. The centralized coordination access point may also moderate the wireless communication signals by influencing both upstream transmission signals and downstream transmission signals associated with at least some of the wireless communication devices.

The aforementioned needs may also be satisfied by a method of scheduling a plurality of wireless communication signals between a first and second protocol that operate with overlapping communication frequencies in a plurality of wireless network devices. The method may comprise monitoring the wireless communication signals of the first and the second protocols and identifying impending collisions between the wireless communication signals of the first and second protocol. The method may further comprise determining the transmission relationship between the plurality of wireless network devices using the first protocol, wherein the transmission relationship further identifies a type of communication link between a master device and a slave device, and implementing a collision avoidance procedure based on the type of communication link between the master device and the slave device to reduce collisions and improve throughput in the wireless communication network.

In one aspect, the method of scheduling includes prioritizing the plurality of wireless communication signals by delaying at least one of the plurality of wireless communication signals derived from at least one of the plurality of wireless network devices using the first protocol. Additionally, the method of scheduling may also include prioritizing the plurality of wireless communication signals by dropping at least one of the plurality of wireless communication signals derived from at least one of the plurality of wireless network devices using the first protocol. Furthermore, the type of communication link may include a voice data type, wherein the voice data type is a synchronous-connection-oriented communication link, and the type of communication link is a general application data type, wherein the general application data type is an asynchronous-connection-link communication link.

Alternatively, the method of scheduling a plurality of wireless communication signals derived from a frequency hopping spread spectrum (FHSS) protocol and a direct sequence spread spectrum (DSSS) protocol that are transmitted with overlapping communication frequencies may comprise the following. First, the methods may comprise monitoring the wireless communication signals of the FHSS and the DSSS protocols, and identifying impending collisions between the wireless communication signals of the FHSS and the DSSS protocols. Additionally, the method may comprise determining the transmission relationship between the plurality of wireless network devices using the FHSS protocol, wherein the transmission relationship further identifies a type of communication link between an FHSS master device and an FHSS slave device, and implementing a collision avoidance procedure based on the type of communication link between the FHSS master device and the DSSS slave device to reduce collisions and improve throughput in the wireless communication network.

These and other objects and advantages of the present invention will become more fully apparent from the following description taken in conjunction with the accompanying drawings.

BRIEF DESCRIPTION OF THE DRAWINGS

These and other aspects, advantages, and novel features of the invention will become apparent upon reading the following detailed description and upon reference to the accompanying drawings. In the drawings, same elements have the same reference numerals in which:

FIGS. 4A–4E illustrate various embodiments of coordinated transmission operations in the wireless network.

DETAILED DESCRIPTION OF THE PREFERRED EMBODIMENT

Although the following description exemplifies one embodiment of the present invention, it should be understood that various omissions, substitutions, and changes in the form of the detail of the apparatus, system, and method as illustrated as well as the uses thereof, may be made by those skilled in the art, without departing from the spirit of the present invention. Consequently, the scope of the present invention should not be limited to the disclosed embodiments, but should be defined by the appended claims.

Figure 1A:
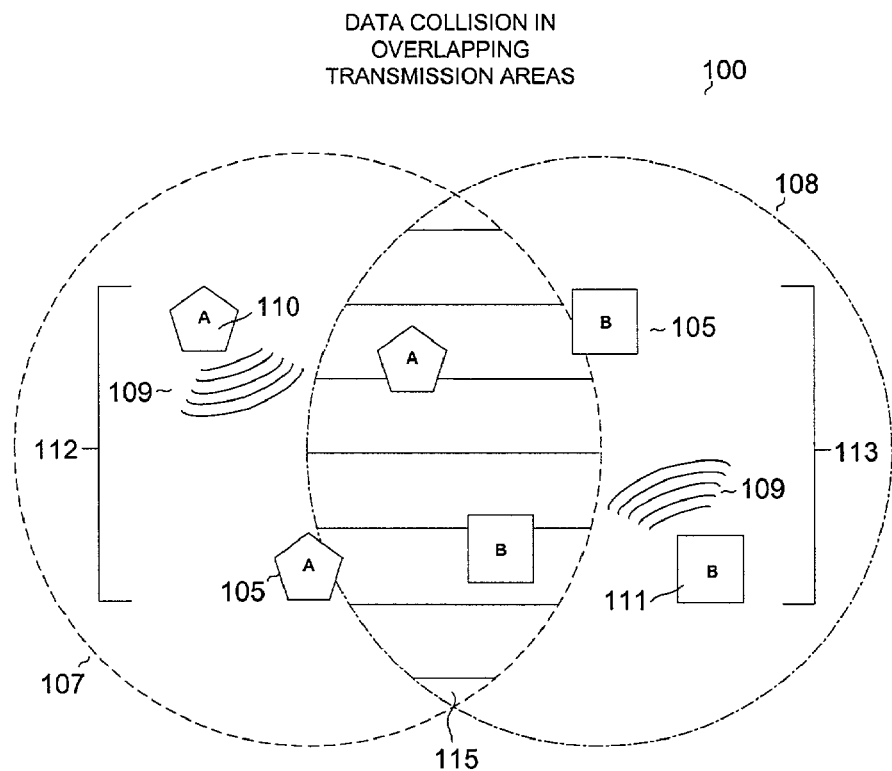
FIG. 1A illustrates one embodiment of a wireless network with overlapping transmission areas.

FIG. 1A illustrates one embodiment of a wireless network 100. A plurality of wireless communication devices or data transfer terminals 105 operate within one or more access areas 107, 108. Each access area 107, 108 is further characterized by a wireless signal reception radius. The signals 109 produced by the wireless communication devices 105 may be received by other wireless communication devices 105 within the same access area 107, 108. The wireless communication devices 105 further utilize a plurality of wireless communication protocols 110, 111. The communication devices 105 within the same access area 107, 108 communicate with other communication devices 105 that operate using the same communication protocol 110, 111. In one embodiment, the wireless communication devices 105 utilize a Bluetooth (BT) wireless communication protocol and a Wireless Local Area Network (WLAN) wireless communication protocol in the wireless network 100.

As shown in the illustrated embodiment, the plurality of communication devices 105 further comprises a first subset 112 of one or more communication devices 105, which operate using a first wireless protocol 110, such as the BT protocol, and a second subset 113 of one or more communication devices 105, which operate using a second wireless protocol 111, such as the WLAN protocol. The nature of the wireless communication protocols 110, 111 is such that at least a portion of the wireless communication protocols 110, 111 operate in a portion of the electromagnetic spectrum. A frequency overlap is established between the first 110 and the second 111 communications protocol. As previously discussed, use of frequency-overlapping protocols may result in collision or interference when the protocols 110, 111 operate within the same vicinity of one another. As is shown in the illustrated embodiment, an interference area 115 occurs in each access area 107, 108, where transmissions made using the first frequency-overlapping protocol 110 coexist with transmissions made using the second frequency-overlapping protocol 111.

It will be appreciated that although the access areas 107, 108 illustrated in FIG. 1A is shown to partially overlap, the access areas 107, 108 may wholly overlap. The communication devices 105, that may use one or more frequency-overlapping protocols 110, 111, are positioned in proximity to one another such that the access area for the frequency-overlapping protocols exists in the same spatial locality (i.e. access areas defined by identical or concentric spatial regions). It will be further appreciated that the communication devices 105 may be positioned within the access areas 107, 108 such that only a portion of the devices 105 reside in the interference area 115 where the communication protocols 110, 111 overlap. The presence, however, of any communication device 105 within the region of overlap is sufficient for creating interference and collisions between the frequency-overlapping protocols 110, 111.

Figure 1B:
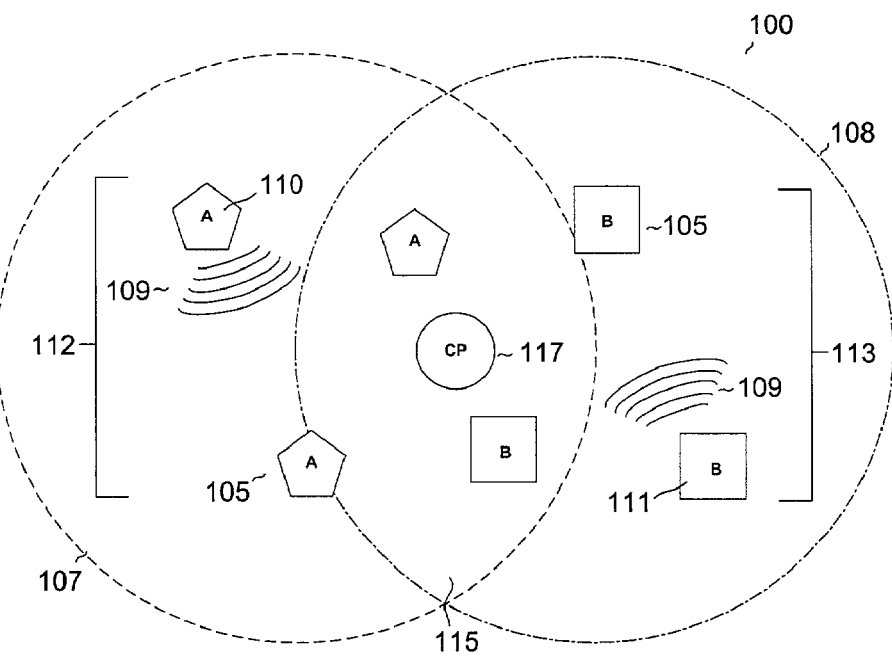
FIG. 1B illustrates the wireless network in FIG. 1A with one embodiment of a centralized control point device.

FIG. 1B illustrates one embodiment of the wireless network 100 integrating a data collision rectification device or centralized coordination point (CCP) device 117, which permits the coexistence of the wireless network 100 with frequency-overlapping protocols 110, 111. In the illustrated embodiment, the CCP device 117 is positioned within the interference region 115 between the two access areas 107, 108. The CCP device 117 serves as a moderator for at least one of the frequency-overlapping protocols 110, 111 to permit uncorrupted data transmissions in the overlying access areas 107, 108 such that collisions and interference between the first 110 and the second 111 frequency-overlapping protocols are reduced. The CCP device 117 moderates data transmissions or signals 109 and controls the flow of data by monitoring and maintaining quality of service parameters for at least one of the protocols 110, 111 in a manner that will be discussed in greater detail herein below.

In one aspect, the CCP device 117 may be implemented as an independent device, which possesses necessary functionality to moderate data transmissions 109 between the frequency-overlapping protocols 110, 111. One desirable feature of the independent CCP device 117 is that it may be conveniently positioned within an existing wireless communications network 110, where data collisions and interference occur to improve data exchange and throughput. In one embodiment, the independent CCP device 117 moderates data transmissions 109 between the overlapping wireless protocols 110, 111 in a manner which does not require other communication devices 105 within the network 100 to be modified or repositioned. It will be appreciated that this feature of the CCP device 117 increases the flexibility and functionality of the wireless network 100 and associated wireless devices 105. Furthermore, the independent CCP device 117 reduces potential costs associated with replacing existing wireless devices 105, which might otherwise interfere with each other due to their use of frequency-overlapping protocols 110, 111.

It will further be appreciated that, although the CCP device 117 is shown positioned in the interference region 109 of the access areas 107, 108, the CCP device 117 may also be positioned elsewhere within the access areas 107, 108. For example, the CCP device 117 may be positioned within the first access area 107 to moderate the first set 112 of wireless devices 105, which are associated with the first frequency-overlapping protocol 110. In this instance, network traffic flow is improved by controlling the first set 112 of wireless devices 105 whose data transfer activities are moderated to prevent collision with the second set 113 of wireless devices 105 whose data transfer activities are not moderated by the CCP device 117.

Figure 2:
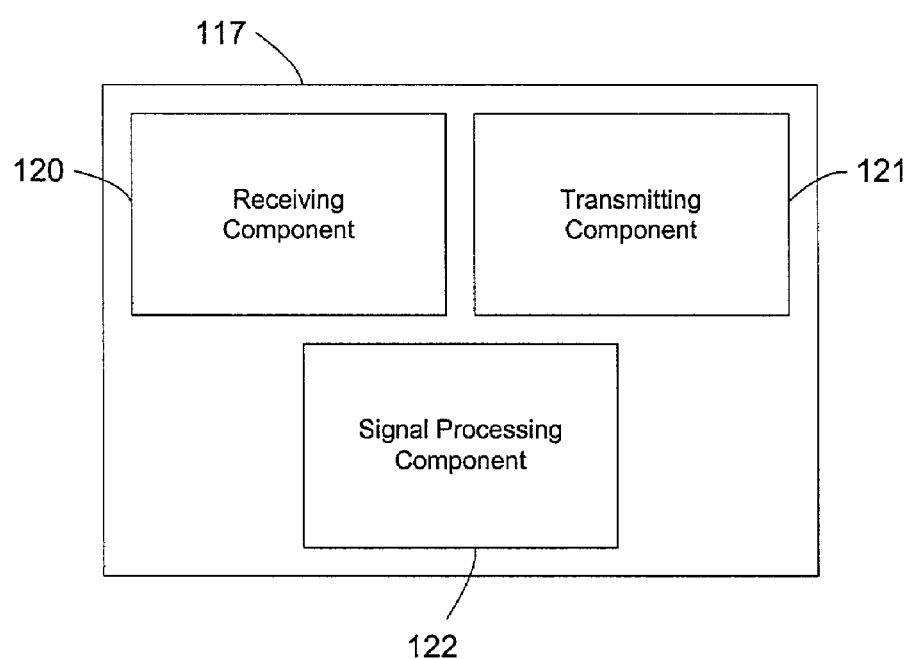
FIG. 2 illustrates one embodiment of a block diagram of the centralized control point device in FIG. 1B.

FIG. 2 illustrates a block diagram of the CCP device 117 architecture utilized to monitor and moderate wireless data transmissions in the wireless network 100. The CCP device 117 comprises a receiving component 120, a transmitting component 121, and a signal processing component 122. The components 120, 121, 122 are configured to work independent of the wireless network devices 105 and to coordinate the frequency-overlapping transmission traffic in the wireless network 100, which use the frequency-overlapping protocols 110, 111.

The receiving component 120 is configured to listen to the wireless transmissions and receive the data packets in the wireless network 100, where the frequency-overlapping protocols 110, 111 are in use. In one embodiment, the receiving component 120 has dual functionality including the capability to receive and demodulate/decode WLAN and BT data packets. In addition, the receiving component 120 has a further capability to provide the signal processing component 122 with the received and demodulated/decoded WLAN and BT data and information.

The transmitting component 121 is configured to transmit data packets in at least one of the frequency-overlapping protocols 110, 111. In one embodiment, the transmitting component 121 has single functionality including the capability to modulate/encode and transmit either WLAN or BT packets within the access areas 107, 108. In another embodiment, the transmitting component 121 has dual functionality including the capability to modulate/encode and transmit WLAN and BT packets within the access areas 107, 108. Additionally, the transmitting component 121 is further equipped with the capability of accepting commands and transmission data from the signal processing component 122.

The signal processing component 122 is configured to control the receiving component 120 and the transmitting component 121. The signal processing component 122 is also configured to exchange data and information with the receiving component 120 and the transmitting component 121. Additionally, the signal processing component 122 has the capability to make transmission traffic coordination decisions based on predetermined criteria. In one embodiment, the signal processing component 122 accepts the decoded data from the receiving component 120, determines the transmission protocol type, and extracts header information that may be present in the data of the received wireless transmission. Furthermore, the signal processing component 122 has the capability to schedule transmissions in the wireless network 100 for the purpose of reducing collisions between data transmissions using the frequency-overlapping protocols 110, 111. The coordination of data transmissions in access areas, such as access areas 107, 108, allows for the coexistence of a plurality of frequency-overlapping protocols 110, 111, such as WLAN and BT protocols.

In one aspect, the IEEE 802.11 medium access control (MAC) provides functionality for a reliable mechanism capable of transmitting data over a wireless network or medium. In one aspect, data is framed into a packet, and the packet includes a header file. A typical wireless transmission header comprises information that includes data packet transmission characteristics, such as the packet data rate, the packet length, the packet timing, and the packet transmission frequency. Moreover, the data packet characteristics are extracted from the header file and utilized by the signal processing component 122 to prioritize packet transmissions within the wireless network 100. Additionally, the signal processing component 122 further utilizes the data packet characteristics to determine if a collision is imminent or likely to occur. If it is determined that a collision between the frequency-overlapping protocols 110, 111 may occur in the wireless network 100, then the signal processing component 122 initiates a collision avoidance procedure to prevent or avoid the collision between the frequency-overlapping protocols 110, 111.

In another aspect, the centralized coordination point device 117 is deployed in a multiple station access area in the wireless network 100. The CCP device 117 may comprise a modified Bluetooth wireless transmission unit and a modified WLAN wireless transmission unit. The Bluetooth unit and the WLAN unit may be modified to include a plurality of wireless network coordination functions as will be described in greater detail herein below. The CCP device 117 may be positioned among standard wireless communication devices 105 in the wireless network 100 where the heaviest or greatest transmission traffic occurs or is likely to occur. The advantage of this network architecture is that the pre-existing wireless communication devices in the wireless network may remain unchanged and unmodified. Through the use and addition of at least one CCP device 117 in the wireless network 100, an improvement in wireless transmission performance and throughput may be achieved.

Figure 3:
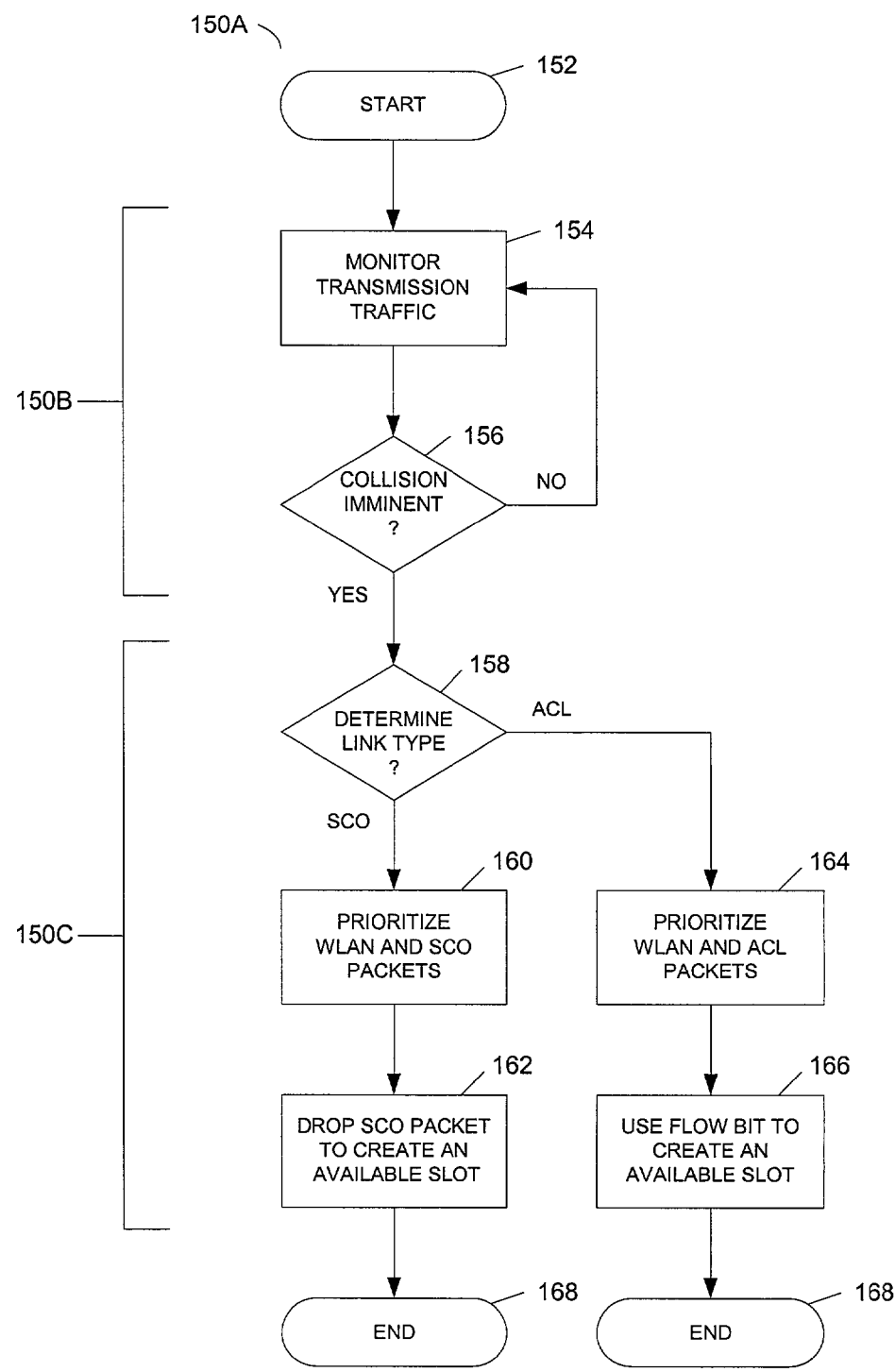
FIG. 3 illustrates one embodiment of a traffic evaluation and coordination function to reduce interference and data corruption in the wireless network.

As discussed previously, the CCP device 117 may prioritize data packets by acquiring timing information from the header characteristics of previously transmitted data packets as well as timing information from data packets that are currently being transmitted. As is illustrated in FIG. 3, the CCP device 117, in one embodiment, functions as a Bluetooth master and may utilize a traffic evaluation and coordination method 150A to reduce interference and data corruption resulting from the simultaneous transmission of WLAN and BT data packets in the wireless network 100.

In one embodiment, the traffic evaluation and coordination method 150A commences in a start state 152 and initiates a traffic evaluation function 150B. The traffic evaluation sequence proceeds to a state 154 where the CCP device 117 monitors the BT and WLAN wireless transmission traffic by receiving, extracting, and analyzing transmission information on the air channel of the wireless network 100. The transmission information may include header information, which is indicative of previously and currently transmitted characteristics of the data packets. In one embodiment, the receiving component 120 monitors the transmission traffic by polling or "listening" to transmission information contained in the wireless transmissions made by BT wireless devices and WLAN wireless devices to identify the transmission characteristics that relate to how data packets are being transmitted via the WLAN and BT stations 105. The transmission characteristics may further include information such as the sequence of data packets being transmitted, the timing of the transmitted data packets, and the frequency or channel that the data packets will be transmitted on.

While monitoring the transmission traffic and header characteristics of the data packets in the state 154, the traffic evaluation and coordination function 150 advances to a state 156. In the state 156, the signal processing component 122 determines if a collision between the frequency-overlapping protocols 110, 111 is imminent or likely to occur. If the data packet collision on the air channel in the wireless network 100 is not likely to occur, then the signal processing component 122 does not proceed to interrupt or moderate the data packet transmission traffic and permits the BT wireless devices and the WLAN wireless devices to transmit information without moderation. As a result, the signal processing component 122 proceeds to continue with the traffic evaluation function 150B and monitor the wireless network transmissions in the state 154.

If, however, a data packet collision or protocol interference is likely to occur, the signal processing component 122 proceeds to another state 158 to begin applying a traffic coordination function 150C, which may be designed to defer BT transmission traffic in such a manner so as to substantially prevent or decrease data collisions or inhibit interference between the WLAN and BT frequency overlapping protocols 110, 111. The traffic coordination function 150C will be discussed in greater detail herein below.

In the evolution of various wireless communication protocols, integration of transmission traffic monitoring with the traffic evaluation and coordination function delineates a flexible yet powerful method for insuring compatibility among frequency-overlapping wireless communication devices in a wireless network. The addition of a centralized control point device in a wireless communication network may improve data throughput and prevent undesirable data corruption and network latency. Moderation of frequency-overlapping protocols using the aforementioned wireless traffic coordination device, system, functions, and methods permits the use of various classes of wireless communication devices, which were until now potentially incompatible with one another.

In one embodiment, the CCP device 117 monitors the wireless network 100 so as to coordinate the transmission traffic of frequency overlapping protocols 110, 111 by prioritizing data packets. By acquiring timing information, packet length information, and transmitting channel frequency information from the header characteristics of previously and currently transmitted data packets, the CCP device 117 may reduce the interference and corruption caused by collisions between the frequency overlapping protocols 110, 111. In one embodiment, the CP device 117 may accomplish this task by utilizing the traffic coordination function 150C to defer the data packets of one protocol, which creates an open channel for the data packets of the other protocol when a collision is imminent or likely to occur.

In another embodiment, the CCP device 117 may utilize the traffic coordination function 150C to reduce interference and data corruption resulting from the simultaneous transmission of BT and WLAN data packets in the wireless network 100. In one embodiment, the CCP device 117 functions as a BT master and has the capability to control the timing of data packets sent from BT slave devices. The traffic coordination function 150C commences in the state 158, where the signal processing component 122 uses, in one embodiment, the header information from the BT data packets to determine the type of communication link between the BT piconet devices. As previously discussed, a BT piconet has at least one master device and one or more slave devices, and BT transmissions involve at least two types of communication links: synchronous-connection-oriented (SCO) and asynchronous-connection-link (ACL). As will be described in greater detail herein below, the SCO communication link is a non-deferrable data type, such as voice transmissions, and the ACL communication link is a deferrable data type, such as general application data transmissions.

If the signal processing component 122 determines that the type of link is an SCO link, then the traffic coordination function 150C proceeds to a state 160. In one embodiment, the signal processing component 122 prioritizes WLAN data packets and SCO data packets by analyzing throughput service levels for WLAN and BT transmissions. The SCO link packets are sent at pre-determined regular intervals, such as a clocked cycle or timing slot. In one aspect, regular operations for BT protocol, except paging and inquiry, are synchronized to a master clock. The master clock may run at approximately 1600 cycles per second, and each cycle may be considered a BT timing slot. In one aspect, a clock cycle may comprise at least one or more timing slots, which will be described in greater detail herein below.

Additionally, the BT master sends downstream transmissions in even numbered clock cycles or timing slots, and the addressed BT slave devices send upstream transmissions in odd numbered clock cycles or timing slots. At each clock cycle or timing slot, the frequency changes with a frequency-hopping sequence that is determined by the BT master device. In another aspect, the BT master device initiates communication with BT slave devices, and BT slaves devices may only transmit data packets when the BT master device addresses a particular BT slave device. In yet another aspect, the SCO packet may contain asynchronous data in addition to the synchronous data. In still another embodiment, an SCO packet may be the length of two, four, or six timing slots.

After prioritizing the WLAN and the BT SCO packets in the state 160, the traffic coordination function 150C proceeds to a state 162. In one embodiment, the signal processing component 122 may decide to give priority to the WLAN packet and drop the timing slot designated for the SCO packet in favor of sending the WLAN packet. In one embodiment, the signal processing component 122 has the capability of not sending a downstream SCO packet. As a result, the slot time on the hopping frequency is freed, and the WLAN packet has an available slot for transmission. The SCO data is lost, but the voice transmission quality remains satisfactory.

In one aspect, a loss of 1% of SCO voice packets does not significantly degrade perceived voice quality. In addition, a 3% to 5% SCO voice packet loss may increase perceived noise, but the voice quality often remains acceptable and understandable. Therefore, if a collision is foreseen by the signal processing component 122, it may elect to drop an SCO packet to give priority to WLAN transmission traffic without severe degradation the data quality of BT SCO transmission traffic. After dropping an SCO packet and creating an available timing slot for the WLAN packet in the state 162, the traffic coordination function 150C proceeds to terminate in an end state 168. It will be appreciated that the traffic evaluation and coordination method 150A may operate continuously and be utilized by the signal processing component 122 to prevent and/or avoid the incidence of collision signals that are imminent or likely to occur. It should be appreciated that voice data types and SCO communication links are synchronous in nature, wherein the voice transmissions are time dependent transfers in a manner such that the voice data packets are non-deferrable. These and others aspects of SCO communication links will be described in greater detail herein below.

If the signal processing component 122 determines that the type of link is an ACL link, then the traffic coordination function 150C proceeds to a state 164. In one embodiment, the signal processing component 122 prioritizes WLAN data packets and BT ACL data packets by analyzing throughput service levels for WLAN and BT transmissions. In normal operation, the ACL link packets are sent randomly in a clocked cycle or timing slot. As previously discussed, regular operations for BT protocol, except paging and inquiry, may be synchronized to a master clock. The master clock may run at approximately 1600 cycles per second, and each cycle may be considered a BT timing slot. In one aspect, the BT master device sends ACL packets in even numbered clock cycles, and the addressed slaves send ACL packets in the following clock cycle. In another aspect, ACL packets sent upstream or downstream may have a length and duration of approximately five clock cycles or timing slots. It should be appreciated that general application data types and ACL communication links are asynchronous in nature, wherein general data transmissions are time independent transfers in a manner such that the general application data packets are deferrable. These and others aspects of ACL communication links will be described in greater detail herein below.

After prioritizing the WLAN and the BT ACL packets in the state 164, the traffic coordination function 150C proceeds to a state 166. In one embodiment, the signal processing component 122 may decide to give priority to the WLAN packet and defer or delay the sending of the ACL packet in favor of sending the WLAN packet. As previously discussed, ACL packets are used to convey general application data, which is asynchronous in character and is sensitive to loss but less so to delay. Therefore, ACL packets may be deferred to free a timing slot for WLAN packet traffic.

In one embodiment, the CCP device 117 defers or delays downstream ACL packet transmissions. In another embodiment, the BT master device orders the BT slave device not to send an upstream ACL packet in response to a downstream ACL packet until further instruction by using a flow bit. The flow bit is located in the header information of BT packet transmissions. In one aspect, the flow bit may be selected to command the BT slave device to wait. In another aspect, the flow bit may be selected to allow the BT slave device to transmit an ACL packet. As a result, the CCP device 117 may use the flow bit to give priority to WLAN packets. After creating an available timing slot for the WLAN packet in the state 162, the traffic coordination function 150C proceeds to terminate in an end state 168. It will be appreciated that the traffic evaluation and coordination method 150A may operate continuously and be used by the signal processing component 122 to prevent and/or avoid the incidence of collision signals that are imminent or likely to occur.

Advantageously, the centralized control point device of the present invention may be incorporated into an existing wireless network with mixed protocols and topologies to increase data throughput by reducing conflicting data transmissions using frequency-overlapping protocols. Furthermore, the traffic evaluation and coordination function or methods, described herein, may be incorporated into a wireless communication device, such as a Bluetooth and/or WLAN wireless communication device. In addition, modifications to existing access or control points may be performed and the traffic evaluation and coordination functions utilized to improve load balancing and frequency sharing functionality across multiple frequency-overlapping protocols without the need for an independent centralized control point device or system.

Figure 4A:
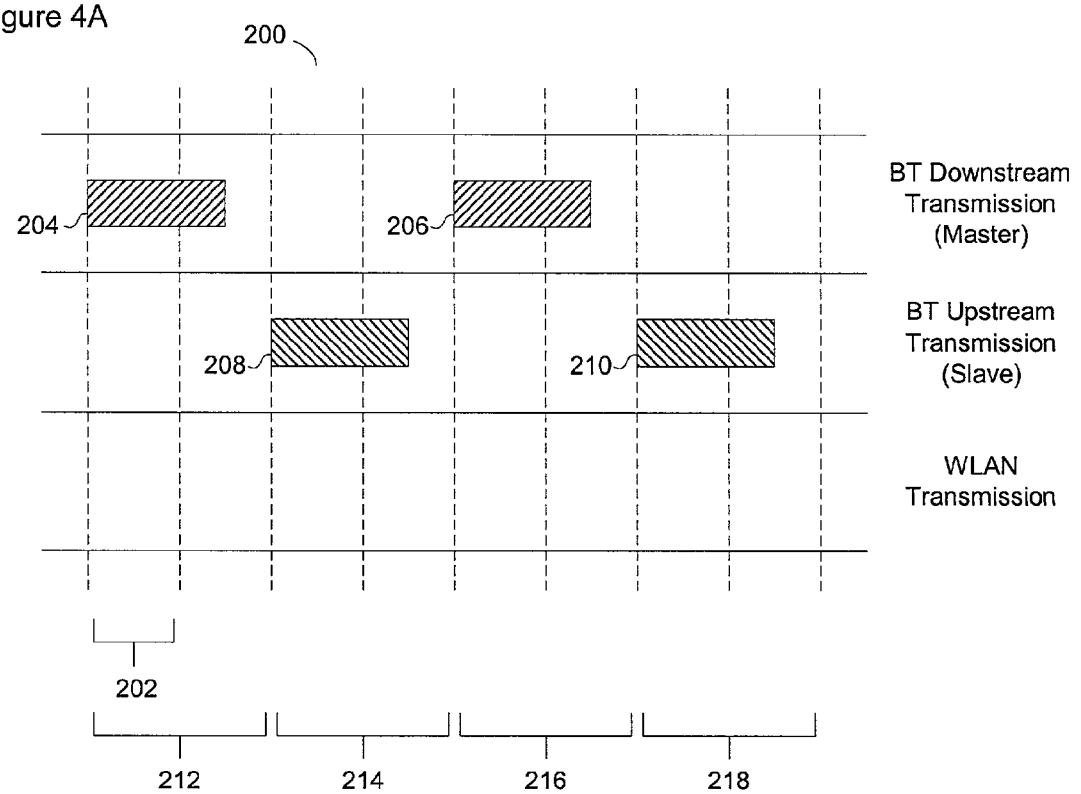

FIG. 4A illustrates one embodiment of a normal BT transmission operation in a transmission region 200, wherein the CCP device 117 acts as a BT master device. At least one BT master device monitors and coordinates the BT transmission traffic in the wireless network 100. The transmission region 200 is sub-divided into a plurality of clock cycles 212, 214, 216, 218, and further sub-divided into a plurality of timing slots 202. A first clock cycle 212 represents an even numbered clock cycle and comprises two timing slots 202. The first clock cycle is followed by a second clock cycle 214, which represents an odd numbered clock cycle and comprises two timing slots 202. Next, a third clock cycle 216 follows the second clock cycle 214 and represents an even numbered clock cycle, which also comprises two timing slots 202. Furthermore, the third clock cycle is followed by a fourth clock cycle 218, which represents an odd numbered clock cycle and comprises two timing slots 202. It should be appreciated that a plurality of clock cycles and timing slots may precede and/or follow the transmission region 200. For descriptive and discussion purposes, this embodiment illustrates at least one part of a transmission sequence.

Additionally, a first downstream packet 204 is sent from the BT master device in the first clock cycle 212. In response to the first BT master downstream packet 204, an addressed BT slave device sends a first upstream packet 208 in the second clock cycle 214. The first upstream packet is followed by a second downstream packet 206, which is sent from the BT master device in the third clock cycle 216. Furthermore, a second upstream packet 210 is sent from the addressed BT slave device in response to the second downstream packet 206 in the fourth clock cycle 218. As illustrated in FIG. 4A, no current WLAN transmissions are illustrated as being sent from the wireless network traffic during this particular transmission region 200.

Figure 4B:
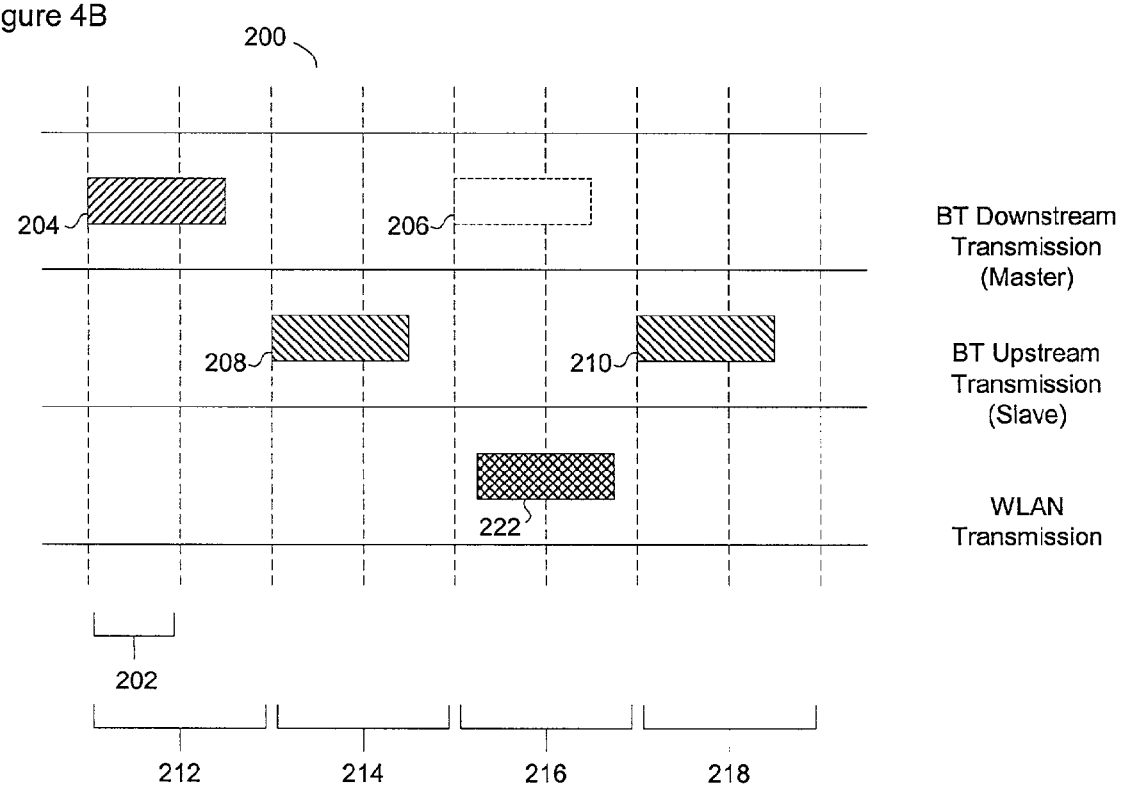

FIG. 4B illustrates one embodiment of an SCO type link transmission in the transmission region 200. The signal processing component 122 may determine, by using the above-mentioned traffic evaluation function 150B, that a packet collision between the second BT downstream packet 206 and a WLAN packet 222 is imminent or likely to occur. Moreover, the signal processing component 122 may further determine that the collision is imminent or likely to occur in the third clock cycle 216, which was pre-assigned for the transmission of the second BT downstream packet 206.

As illustrated in FIG. 4B, the signal processing component 122 uses the traffic coordination function 150C to avoid a packet collision in the third clock cycle 216. In continuation, the signal processing component 122 elects not to send the BT downstream packet 206, which advantageously gives priority to the WLAN packet 222. As a result of implementing the traffic evaluation and coordination method 150A, a collision was avoided between the BT packet 206 and WLAN packet 222. In one aspect, the SCO packet 206 may not be retransmitted, but the signal processing component 122 previously determined that the packet loss was acceptable and further determined that BT SCO linked service levels were not significantly reduced.

FIG. 4C illustrates another embodiment of an SCO type link transmission in the transmission region 200. By utilizing the traffic evaluation function 150B, the signal processing component 122 may determine that a packet collision between the first BT upstream packet 208 and the WLAN packet 222 is imminent or likely to occur. In addition, the signal processing component 122 may further determine that the collision is imminent or likely to occur in the second clock cycle 214, which was pre-assigned for the transmission of the first BT upstream packet 208.

As illustrated in FIG. 4C, the signal processing component 122 uses the traffic coordination function 150C to avoid a packet collision in the second clock cycle 214. In continuation, the monitoring device 122 may erroneously address the BT downstream packet 204, which makes the second clock cycle 214 available for the WLAN packet 222. By erroneously addressing the downstream packet 204, the upstream packet 208 will not be sent because the BT master device did not address a particular slave device with the first BT downstream packet 204 in the wireless network 100. Advantageously, this procedure avoids a collision between the BT upstream packet 208 and the WLAN packet 222, which gave priority to the WLAN packet 222. In this instance, the SCO packet 208 may be unable to be retransmitted, but the signal processing component 122 may determine that the packet loss was acceptable and did not significantly reduce BT SCO linked service levels. As a result of implementing the traffic evaluation and coordination function 150A, a packet collision was avoided in the second clock cycle 214.

FIG. 4D illustrates one embodiment of an ACL type link transmission in the transmission region 200. The signal processing component 122 may determine, by utilizing the traffic evaluation function 150B, that a packet collision between the first BT downstream packet 204, the first BT upstream packet 208, and the WLAN packet 222 is imminent or likely to occur. Additionally, the signal processing component 122 may further determine that the collision is imminent or likely to occur in the first and the second clock cycle 212, 214. In one aspect, the first clock cycle was pre-assigned for the transmission of the first BT downstream packet 204, and the second clock cycle was pre-assigned for the transmission of the first BT upstream packet 208.

As illustrated in FIG. 4D, the signal processing component 122 uses the traffic coordination function 150C to avoid a packet collision in the first and second clock cycle 212, 214. In continuation, the signal processing component 122 elects to delay the transmission of the BT downstream packet 204, which also delays the transmission of the first BT upstream packet 208. Advantageously, this procedure defers BT packet 204, 208 transmissions to give priority to the WLAN packet 222 by deferring the BT ACL packets 204, 208, which made the first and the second clock cycle 212, 214 available for the WLAN packet 222 transmission. After the implementation of the delay by the signal processing component 122, the first BT downstream packet 204 is resolved in the third clock cycle 216, and the first BT upstream packet is resolved in the fourth clock cycle 218. Additionally, the ACL packets 204, 208 may be deferred without a reduction in BT service levels. Asynchronous data packets may be sent randomly and are not usually sensitive to delay. Therefore, as a result of implementing the traffic evaluation and coordination method 150A, a collision was avoided and the BT packets 204, 208 were recovered in the third and fourth clock cycles 216, 218 respectively.

FIG. 4E illustrates another embodiment of an ACL type link transmission in the transmission region 200. By utilizing the traffic evaluation function 150B, the signal processing component 122 may determine that a packet collision between the first BT upstream packet 208 and the WLAN packet 222 is imminent or likely to occur. In addition, the signal processing component 122 may further determine that the collision is imminent or likely to occur in the second clock cycle 214. In one aspect, the second clock cycle 214 was pre-assigned for the transmission of the first BT downstream packet 204.

As illustrated in FIG. 4E, the signal processing component 122 uses the traffic coordination function 150C to avoid a packet collision in the second clock cycle 214. In continuation, the signal processing component 122 elects to avoid the packet collision by sending the first BT downstream packet 204 with the flow bit set to "stop," which commands the addressed BT slave device to not send the first BT upstream packet 208. Advantageously, this procedure halts the transmission of the first BT upstream packet 208 transmission to give priority to the WLAN packet 222 by using the flow bit to make the second clock cycle 214 available for the WLAN packet 222 transmission. Furthermore, when the second BT downstream packet 206 is sent, the signal processing component 122 set the flow bit to "go" to allow the BT slave device to send the second upstream packet 210. As a result of implementing the traffic evaluation and coordination method 150A, a collision was avoided in the second clock cycle 214.

In the various embodiments of the previously described collision avoidance method, a centralized coordination point device that moderates a plurality of frequency-overlapping protocols simultaneously 110, 111 is advantageous to implement into the wireless network 100. Moderation of multiple protocols provides a greater level of control and permits the CCP device 117 to effectively manage multiple protocols to insure that service level efficiency is maintained. However, it is conceived that the above-described CCP device 117 may exert moderation control in a single protocol 110, 111 wireless network. The single protocol configuration of the CCP device 117 may effectively moderate data traffic to prevent data collisions or interference, which may degrade data packet throughput.

In the development of numerous wireless communication standards, incorporation of monitoring the transmission traffic with the traffic evaluation and coordination function represents a flexible yet powerful way to insure compatibility among frequency-overlapping wireless communication devices in a wireless network to improve data throughput and prevent undesirable data corruption and network latency. Coordination of frequency-overlapping protocols using the aforementioned wireless traffic coordination device, system, and method permits the use of numerous classes of wireless communication devices, which were until now incompatible with one another.

A further benefit of this invention is the formation of a centralized control point device, which may be incorporated into an existing wireless network with mixed protocols and topologies to increase data throughput by reducing conflicting data transmissions. The traffic evaluation and coordination function or method described herein may also be integrated into a new wireless communication device and network designs to improve load balancing and frequency sharing functionality across multiple frequency-overlapping protocols without the need for an independent centralized control point device or system.

Although the following description exemplifies one embodiment of the present invention, it should be understood that various omissions, substitutions, and changes in the form of the detail of the apparatus, system, and method as illustrated as well as the uses thereof, may be made by those skilled in the art, without departing from the spirit of the present invention. Consequently, the scope of the present invention should not be limited to the disclosed embodiments, but should be defined by the appended claims.

What is claimed is:

1. A centralized coordination device for a wireless communication network, wherein a first plurality of communication devices using a first protocol and a second plurality of communication devices using a second protocol exchange data transmissions within the wireless communication network using at least partially overlapping communication frequencies, the first plurality of communication devices comprising a master device and a slave device, wherein communications from the master device to the slave device comprise downstream data transmissions and communications from the slave device to the master device comprise upstream data transmissions, the centralized coordination device comprising:

a receiving component configured to receive data transmissions derived from the first and second plurality of communication devices; and a signal processing component that assesses the data transmissions received by the receiving component to identify impending collisions between data transmissions using the first and the second protocols; determines a communication link type between the master device and the slave device using the first protocol and moderates the data transmissions by influencing the downstream data transmissions associated with at least some of the communication devices.

2. The centralized coordination device of claim 1 wherein the signal processing component reduces collisions between data transmissions exchanged using the first protocol and the second protocol.

3. The centralized coordination device of claim 1, wherein the communication link type is a non-deferrable data type.

4. The centralized coordination device of claim 3, wherein the non-deferrable data type is a voice data type having a synchronous-connection-oriented (SCO) communication link.

5. The centralized coordination device of claim 1, wherein type of communication link is a deferrable data type having an asynchronous-connection-link (ACL) communication link.

6. The centralized coordination device of claim 1, wherein the signal processing component prioritizes the exchange of data transmissions by delaying data transmission exchange between the first or second protocol.

7. The centralized coordination device of claim 1, wherein the signal processing component prioritizes the exchange of data transmissions by dropping at least some of the data transmissions exchanged between the first or the second protocol.

8. The centralized coordination device of claim 1, wherein the device is interposed between a backbone network and the wireless communications network and acts as an access point to link the wireless communication devices to the backbone network.

9. The centralized coordination device of claim 8, wherein the backbone network comprises land-based networks including Ethernet, digital subscriber line, dial-up, or plane telephone networks.

10. The centralized coordination device of claim 1, wherein the first protocol or the second protocol is a frequency-hopping spread spectrum protocol.

11. The centralized coordination device of claim 10, wherein the frequency-hopping spread spectrum protocol comprises a Bluetooth protocol.

12. The centralized coordination device of claim 1, wherein the first or the second protocol is a direct-sequence spread spectrum protocol.

13. The centralized coordination device of claim 12, wherein the direct-sequence spread spectrum protocol comprises a wireless local area network (WLAN) protocol.

14. A centralized coordination device for a wireless communication network, wherein a plurality of communication devices using a first protocol and a second protocol transmit a plurality of frequency-overlapping data transmissions in the wireless communication network, the device comprising:
  a receiving component configured to receive the plurality of frequency-overlapping data transmissions:
  a signal processing component configured to analyze timing characteristics from the plurality of frequency-overlapping data transmissions; communicate with the receiving component; determine a type of communication link type established by the communication devices using the first protocol; determine a throughput service level and a desired service quality for the data transmissions using the first and second protocols; and prioritize the plurality of frequency-overlapping data transmissions based on the communication link type used by devices communicating using the first protocol, the timing characteristics, the throughput service level, and the desired service quality for the first and second protocols to reduce collisions in the data transmissions of the first and second protocols.

15. The centralized coordination device of claim 14, wherein the communication link type is a non-deferrable data type.

16. The centralized coordination device of claim 15, wherein the non-deferrable data type is a voice data type.

17. The centralized coordination device of claim 16, wherein the voice data type is a synchronous-connection-oriented (SCO) communication link.

18. The centralized coordination device of claim 14, wherein the communication link type is a deferrable data type.

19. The centralized coordination device of claim 18, wherein the deferrable data type is an asynchronous-connection-link (ACL) communication link.

20. The centralized coordination device of claim 14, wherein the first or second protocol is a frequency-hopping spread spectrum protocol.

21. The centralized coordination device of claim 20, wherein the frequency-hopping spread spectrum protocol comprises a Bluetooth protocol.

22. The centralized coordination device of claim 14, wherein the first or second protocol is a direct-sequence spread spectrum protocol.

23. The centralized coordination device of claim 22, wherein the direct-sequence spread spectrum protocol comprises an IEEE 8.02.11B wireless local area network (WLAN) protocol.

24. The centralized coordination device of claim 14, wherein the centralized coordination device device is configured to interface with a backbone network.

25. The centralized coordination device of claim 24, wherein the backbone network comprises land-based networks including Ethernet, digital subscriber line, dial-up, or plane telephone networks.

26. A centralized coordination system for a wireless communication network, wherein data transmissions are exchanged using overlapping communication frequencies, the system comprising:
  a station access area, wherein a plurality of Bluetooth communication devices using a Bluetooth protocol generate a plurality of Bluetooth data transmissions, and a plurality of WLAN communication devices using a WLAN protocol generate a plurality of WLAN data transmissions;
  a Bluetooth master device configured to receive and analyze the plurality of Bluetooth data transmissions derived from the plurality of Bluetooth communication devices and the plurality of WLAN data transmissions derived from the plurality of WLAN communication devices, wherein the Bluetooth master device evaluates the timing of the plurality of Bluetooth and the WLAN data transmissions, identifies impending collisions between the plurality of Bluetooth and the WLAN data transmissions in the wireless communication networks; determines a type of communication link established between the Bluetooth master device and the plurality of Bluetooth communication devices, and wherein the Bluetooth master device prioritizes the plurality of wireless network transmissions by dropping at least some of the Bluetooth data transmissions to reduce collisions between Bluetooth and WLAN data transmissions and to improve throughput in the wireless communication network.

27. The system of claim 26, wherein the Bluetooth master device is interposed between a backbone network and the station access area to regulate the wireless data transmissions between the plurality of Bluetooth and WLAN communication devices and the backbone network.

28. A communication system for wireless network comprising:
   a plurality of wireless communication devices, which communicate using a first and a second frequency-overlapping data exchange protocol;
   a centralized coordination point used to control the exchange of data transmissions between at least some of the wireless communication devices using at least one of a plurality of frequency-overlapping data exchange protocols;
   a signal processing component used by the centralized coordination point to monitor the wireless data transmissions of the first and the second protocol, to identify impending collisions between the wireless data transmissions of the first and second protocol, to determine the transmission relationship between the plurality of wireless network devices using the first protocol, wherein the transmission relationship further identifies a communication link between a master device and a slave device, wherein the master device communicates with the slave device using downstream data transmissions and the slave device communicates with the master device using upstream data transmissions; and a to implement a collision avoidance procedure based on the type of communication link between the master device and the slave device to reduce collisions and improve throughput in the wireless communication network, wherein the signal processing component moderates the wireless data transmissions by influencing the downstream data transmissions associated with at least some of the wireless communication devices.

29. The system of claim 28, wherein one of the plurality of frequency-overlapping data exchange protocols further comprises the Bluetooth network protocol.

30. The system of claim 28, wherein one of the plurality of frequency-overlapping data exchange protocols further comprises the IEEE 802.11B wireless local area network (WLAN) protocol.

31. A communication system for a wireless network comprising:
   a plurality of wireless communication devices, which communicate using a first and a second frequency-overlapping data exchange protocol;
   a centralized coordination access point used to control the exchange of data and information between at least some of the wireless communication devices using at least one of a plurality of frequency-overlapping data exchange protocols;
   a signal processing component used by the centralized coordination access point to monitor the wireless communication signals of the first and the second protocol;
   an evaluation component used by the centralized coordination access point to identify impending collisions between the wireless communication signals of the first and second protocol;
   a coordination component used by the centralized coordination access point to determine the transmission relationship between the plurality of wireless network devices using the first protocol, wherein the transmission relationship further identifies a communication link between a master device and a slave device, wherein the master device communicates with the slave device using downstream transmission signals and the slave device communicates with the master device using upstream transmission signals; and
   a synchronization component used by the centralized coordination access point to implement a collision avoidance procedure based on the type of communication link between the master device and the slave device to reduce collisions and improve throughput in the wireless communication network, wherein the centralized coordination access point moderates the wireless communication signals by influencing the downstream transmission signals associated with at least some of the wireless communication devices.

32. A communication system for a wireless network comprising:
   a plurality of wireless communication devices, which communicate using a first and a second frequency-overlapping data exchange protocol;
   a centralized coordination access point used to control the exchange of data and information between at least some of the wireless communication devices using at least one of a plurality of frequency-overlapping data exchange protocols;
   a signal processing component used by the centralized coordination access point to monitor the wireless communication signals of the first and the second protocol;
   an evaluation component used by the centralized coordination access point to identify impending collisions between the wireless communication signals of the first and second protocol;
   a coordination component used by the centralized coordination access point to determine the transmission relationship between the plurality of wireless network devices using the first protocol, wherein the transmission relationship further identifies a communication link between a master device and a slave device, wherein the master device communicates with the slave device using downstream transmission signals and the slave device communicates with the master device using upstream transmission signals; and
   a synchronization component used by the centralized coordination access point to implement a collision avoidance procedure based on the type of communication link between the master device and the slave device to reduce collisions and improve throughput in the wireless communication network, wherein the centralized coordination access point moderates the wireless communication signals by influencing both upstream transmission signals and downstream transmission signals associated with at least some of the wireless communication devices.

33. A communication system for a wireless network comprising:
   a plurality of wireless communication devices, which communicate using a first and a second frequency-overlapping data exchange protocol;
   a centralized coordination access point used to control the exchange of data and information between at least some of the wireless communication devices using at least one of a plurality of frequency-overlapping data exchange protocols;
   a signal processing component used by the centralized coordination access point to monitor the wireless communication signals of the first and the second protocol;

an evaluation component used by the centralized coordination access point to identify impending collisions between the wireless communication signals of the first and second protocol;

a coordination component used by the centralized coordination access point to determine the transmission relationship between the plurality of wireless network devices using the first protocol, wherein the transmission relationship further identifies a communication link between a master device and a slave device, wherein the master device communicates with the slave device using downstream transmission signals and the slave device communicates with the master device using upstream transmission signals; and a synchronization component used by the centralized coordination access point to implement a collision avoidance procedure based on the type of communication link between the master device and the slave device to reduce collisions and improve throughput in the wireless communication network wherein the centralized coordination access point further acts as a Bluetooth master to control upstream and downstream data exchange between wireless communication devices, which communicate using the Bluetooth network protocol.

34. A method of scheduling a plurality of wireless data transmissions between a first and second protocol that operate with overlapping communication frequencies in a plurality of wireless communication devices, the method comprising:

monitoring the wireless data transmissions of the first and the second protocols;

identifying impending collisions between the wireless data transmissions of the first and second protocols;

determining the transmission relationship between the plurality of wireless communication devices using the first protocol, wherein the transmission relationship further identifies a type of communication link between a master device and a slave device, and wherein the master device communicates with the slave device using downstream data transmissions and the slave device communicates with the master device using upstream data transmissions; and implementing a collision avoidance procedure based on the type of communication link between the master device and the slave device by influencing the downstream data transmissions associated with at least some of the wireless communication devices to reduce collisions and improve throughput in the wireless communication network.

35. The method of claim 34, wherein the type of communication link is a voice data type.

36. The method of claim 35, wherein the voice data type is a synchronous-connection-oriented (SCO) communication link.

37. The method of claim 34, wherein the type of communication link is a general application data type.

38. The method of claim 37, wherein the general application data type is an asynchronous-connection-link (ACL) communication link.

39. The method of claim 34, wherein the method of scheduling further comprises prioritizing the plurality of wireless data transmissions by delaying at least one of the plurality of wireless data transmissions derived from the at least one of the plurality of wireless communication devices using the first protocol.

40. The method of claim 34, the method of scheduling further comprises prioritizing the plurality of wireless data transmissions by dropping at least one of the plurality of wireless data transmissions derived from at least one of the plurality of wireless network devices using the first protocol.

41. The method of claim 34, wherein the plurality of wireless communication devices communicate with a backbone network.

42. The method of claim 41, wherein the backbone network comprises land-based networks including Ethernet, digital subscriber line, dial-up, plane telephone networks.

43. The method of claim 34, wherein the first protocol is defined as a frequency-hopping spread spectrum protocol.

44. The method of claim 43, wherein the frequency-hopping spread spectrum protocol comprises a Bluetooth protocol.

45. The method of claim 34, wherein the second protocol is defined as a direct-sequence spread spectrum protocol.

46. The method of claim 45, wherein the direct sequence spread spectrum protocol comprises an IEEE 802.11B wireless local area network (WLAN) protocol.

47. A method of scheduling a plurality of wireless data transmissions derived from a frequency hopping spread spectrum (FHSS) protocol and a direct sequence spread spectrum (DSSS) protocol that are transmitted with overlapping communication frequencies, the method comprising:

monitoring the wireless data transmissions of the FHSS and the DSSS protocols;

identifying impending collisions between the wireless data transmissions of the FHSS and the DSSS protocols;

determining the transmission relationship between the plurality of wireless network devices using the FHSS protocol, wherein the transmission relationship further identifies a type of communication link between an FHSS master device and an FHSS slave device; and implementing a collision avoidance procedure based on the type of communication link between the FHSS master device and the DSSS slave device, wherein the collision avoidance procedure moderates the wireless data transmissions by influencing downstream data transmissions associated with at least some of the communication devices by dropping at least one of the plurality of wireless data transmissions derived from the FHSS protocol to reduce collisions and improve throughput in the wireless communication network.

48. The method of claim 47, wherein the type of communication link is a synchronous-connection-oriented (SCO) communication link.

49. The method of claim 48, wherein the synchronous-connection-oriented (SCO) communication link is a non-deferrable voice data type.

50. The method of claim 47, wherein the type of communication link is an asynchronous-connection-link (ACL) communication link.

51. The method of claim 50, wherein the asynchronous-connection-link (ACL) communication link is a deferrable general application data type.

52. The method of claim 47, wherein the wireless communication network communicates with a backbone network.

53. The method of claim 52, wherein the backbone network comprises land-based networks including Ethernet, digital subscriber line, dial-up, or plane telephone networks.

* * * * *

UNITED STATES PATENT AND TRADEMARK OFFICE
CERTIFICATE OF CORRECTION

PATENT NO. : 7,167,484 B2  
APPLICATION NO. : 10/066284  
DATED : January 23, 2007  
INVENTOR(S) : Ping Liang et al.

It is certified that error appears in the above-identified patent and that said Letters Patent is hereby corrected as shown below:

On Title page, Column 1, item 75 under Inventors, please delete "Menghua Chen" and insert therefore, --Minghua Chen--.

Column 17, Line 54, before "device" please add --centralized coordination--.

Column 17, line 57, please delete "transmissions:" and insert therefore, --transmissions;--.

Column 18, Line 32, please delete "8.02.11B" and insert therefore, --802.11B--.

Column 18, Line 34, after "coordination device" please delete "device".

Column 18, Line 61, please delete "networks;" and insert therefore, --network,--.

Column 19, Line 31, after "and" please delete "a".

Column 22, Line 11, after "dial-up" please add --or--.

Signed and Sealed this

Twenty-eighth Day of August, 2007

JON W. DUDAS  
*Director of the United States Patent and Trademark Office*